US 8,871,381 B2

(12) United States Patent
Park

(10) Patent No.: US 8,871,381 B2
(45) Date of Patent: Oct. 28, 2014

(54) SECONDARY BATTERY

(75) Inventor: Jeong-Man Park, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 793 days.

(21) Appl. No.: 12/805,399

(22) Filed: Jul. 29, 2010

(65) Prior Publication Data

US 2011/0064996 A1    Mar. 17, 2011

(30) Foreign Application Priority Data

Sep. 15, 2009 (KR) .................. 10-2009-0086933

(51) Int. Cl.
| | |
|---|---|
| H01M 2/08 | (2006.01) |
| H01M 2/34 | (2006.01) |
| H01M 10/04 | (2006.01) |
| H01M 10/0587 | (2010.01) |
| H01M 2/04 | (2006.01) |

(52) U.S. Cl.
CPC ............ *H01M 10/0587* (2013.01); *H01M 2/34* (2013.01); *H01M 10/0431* (2013.01); *H01M 2/08* (2013.01); *Y02E 60/12* (2013.01); *H01M 2/0404* (2013.01)
USPC ........................................................ 429/185

(58) Field of Classification Search
None
See application file for complete search history.

(56) References Cited

U.S. PATENT DOCUMENTS

| | | | | |
|---|---|---|---|---|
| 2005/0136325 | A1* | 6/2005 | Fujihara et al. | ............... 429/176 |
| 2006/0246349 | A1 | 11/2006 | Uh | |
| 2008/0081252 | A1* | 4/2008 | Miyazaki | ...................... 429/149 |
| 2008/0274402 | A1* | 11/2008 | Uh | ................. 429/174 |

FOREIGN PATENT DOCUMENTS

| | | |
|---|---|---|
| KR | 10-0624957 B1 | 9/2006 |
| KR | 10-2007-0108765 A | 11/2007 |
| KR | 1020070108765 A * | 11/2007 |
| KR | 10-0816218 B1 | 3/2008 |

OTHER PUBLICATIONS

Korean Office Action in KR 10-2009-0086933, dated Mar. 21, 2012 (Park).
Korean Office Action in KR 10-2009-0086933, dated Dec. 24, 2010 (Park).

* cited by examiner

*Primary Examiner* — Ula C Ruddock
*Assistant Examiner* — Daniel Gatewood
(74) *Attorney, Agent, or Firm* — Lee & Morse, P.C.

(57) ABSTRACT

A secondary battery includes an electrode assembly having a positive electrode plate, a negative electrode plate, and a separator interposed between the positive and negative electrode plates, a can having at least one groove portion on an inner surface thereof, the electrode assembly being inserted into the can through an opening of the can to face the inner surface of the can, a cap assembly configured to seal the opening of the can, and an insulation case positioned in the can between the electrode assembly and the cap assembly, the insulation case including at least one protruding portion inserted into the groove portion of the can.

20 Claims, 4 Drawing Sheets

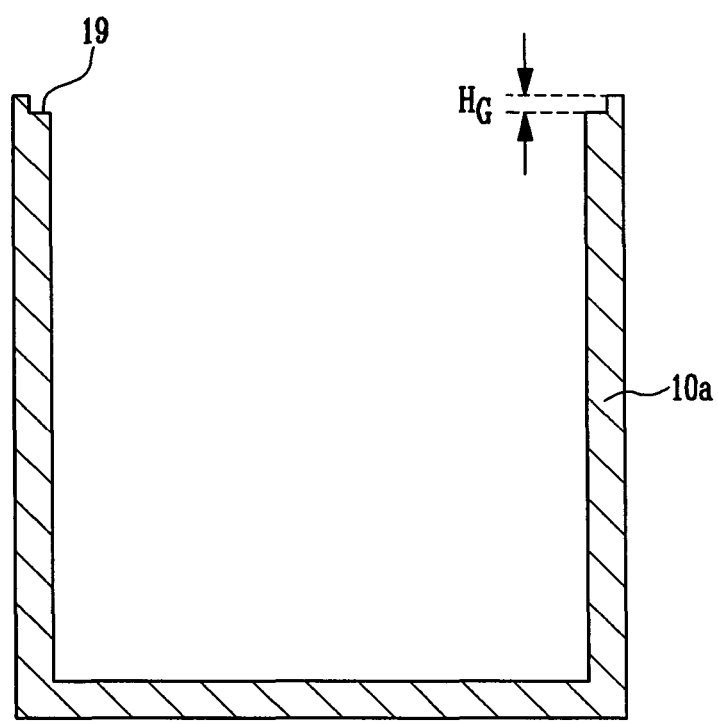

SECONDARY BATTERY

BACKGROUND

1. Field

Example embodiments relate to a secondary battery. More particularly, example embodiments relate to a secondary battery capable of preventing a short circuit between positive and negative electrode plates by preventing inclination of an insulation case inserted into a can of the secondary battery.

2. Description of the Related Art

As smaller and lighter electronic portable devices are rapidly developing, secondary batteries are developing as their driving power sources. Such secondary batteries may include, e.g., a nickel-cadmium battery, a nickel-hydrogen battery, a nickel-zinc battery, a lithium secondary battery, and the like. For example, the lithium secondary battery is a rechargeable and compact battery having a large capacity, and thus, is widely applied to high-tech electronic devices because of its high operating voltage and high energy density per unit weight.

A conventional secondary battery, e.g., a lithium secondary battery, may include an electrode assembly and an electrolyte in a can, and a cap assembly sealing a top of the can. The electrode assembly may include a positive electrode plate, a negative electrode plate, and a separator interposed between the positive and negative electrode plates.

The electrode assembly may be formed by winding the separator interposed between the positive and negative electrode plates. A positive electrode tab may be connected to the positive electrode plate to protrude upward from a top portion of the electrode assembly. A negative electrode tab may be connected to the negative electrode plate to protrude upward from a top portion of the electrode assembly. In the electrode assembly, the positive and negative electrode tabs may be spaced apart from each other at a predetermined interval so as to be electrically isolated from each other.

SUMMARY

Embodiments are directed to a secondary battery, which substantially overcomes one or more of the problems due to the limitations and disadvantages of the related art.

It is therefore a feature of an embodiment to provide a secondary battery having a groove portion in a battery can and an insulation case with a protruding portion inserted into the groove portion of the battery case, so that inclination of the insulation case may be prevented.

At least one of the above and other features and advantages may be realized by providing a secondary battery, including an electrode assembly having an positive electrode plate, a negative electrode plate and a separator interposed between the positive and negative electrode plates, a can having at least one groove portion on an inner surface thereof, the electrode assembly being inserted into the can through an opening of the can to face the inner surface of the can, a cap assembly configured to seal the opening of the can, and an insulation case positioned in the can between the electrode assembly and the cap assembly, the insulation case including at least one protruding portion inserted into the groove portion of the can.

In one embodiment, the can may includes two narrow sidewalls and two wide sidewalls arranged alternately, the opening of the can having a rectangular shape, and the groove portion being in the narrow sidewall of the can. The opening of the can may have a rectangular shape with rounded corners, the insulation case having a substantially same shape as the opening. A thickness of the narrow sidewall of the can may be larger that that of the wide sidewall of the can, the wide sidewall extending in a longitudinal direction of the can. The can may include a pair of groove portions in opposite sidewalls of the can, the insulation case including a pair of protruding portions corresponding to the pair of groove portions. The pair of groove portions may be symmetrical with respect to a center of the can. The can may include a single groove portion. A cross-section of each of the groove portion and the protruding portion may be rectangular. The protruding portion may entirely fit inside the groove portion, the groove portion overlapping three surfaces of the protruding portion. An upper surface of the protruding portion and an upper surface of the groove portion extend along a same plane.

The groove portion and the protruding portion may substantially equal each other. A height of the protruding portion along a vertical direction may substantially equal a depth of the groove portion along the vertical direction. The groove portion may extends from a top of the can to a predetermined thickness along a horizontal direction and to a predetermined depth a long a vertical direction, a top of the insulation case contacting the can and being substantially coplanar with the top of the can. The insulation case may include a base portion, a support portion extending on sidewalls of the can, and the protruding portion at an upper-most edge of the support portion. The protruding portion of the insulation case and a bottom of the insulation case may be spaced apart from each other along a vertical direction to be in different planes.

BRIEF DESCRIPTION OF THE DRAWINGS

The above and other features and advantages will become more apparent to those of ordinary skill in the art by describing in detail exemplary embodiments with reference to the attached drawings, in which:

FIG. 2 illustrates a sectional view taken along line A-A' of FIG. 1;

DETAILED DESCRIPTION

Figure 1:
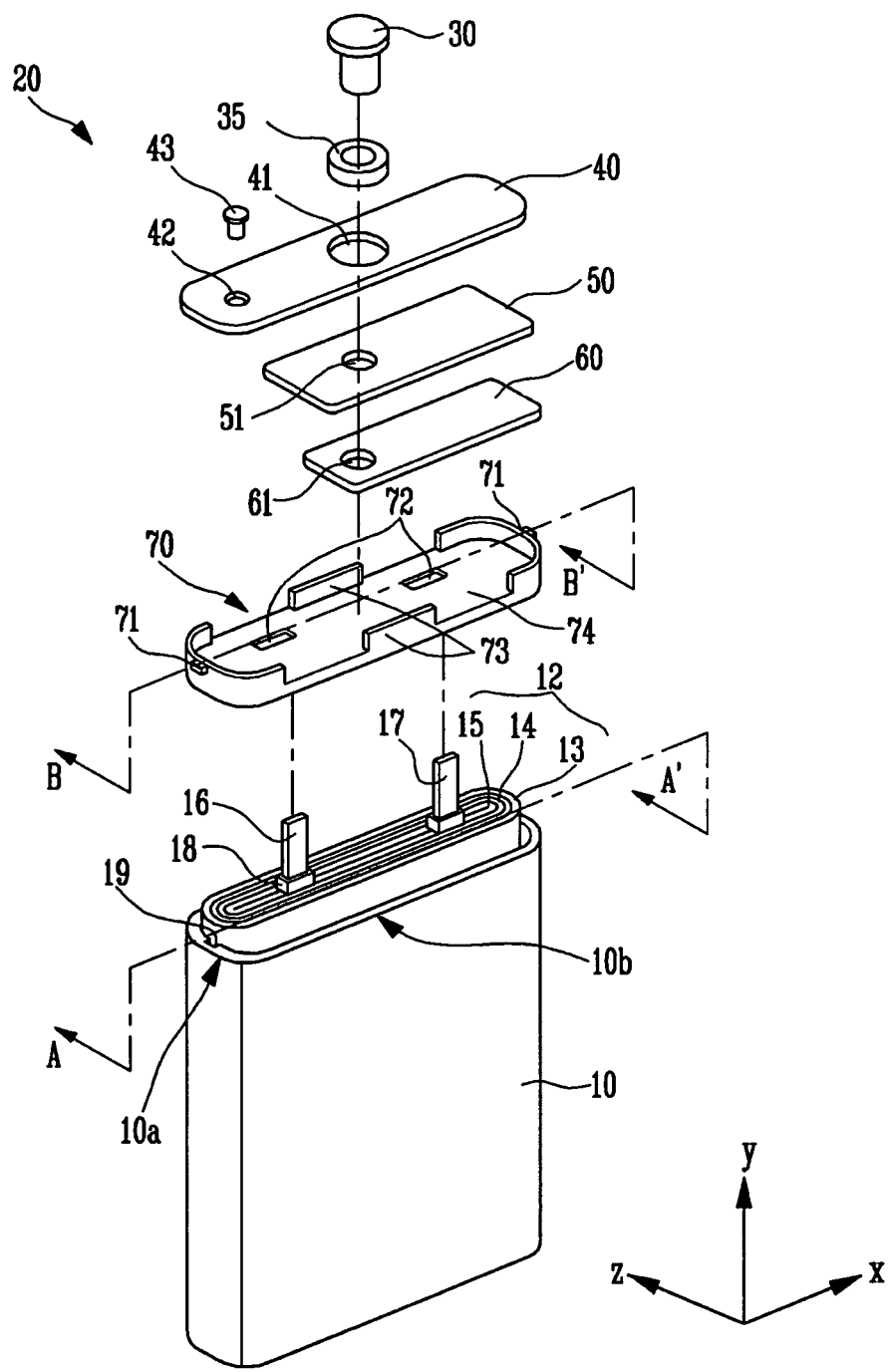
FIG. 1 illustrates an exploded perspective view of a secondary battery according to an embodiment.

Korean Patent Application No. 10-2009-0086933, filed on Sep. 15, 2009, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element or substrate, it can be directly on the other element or substrate, or intervening elements may also be present. Further, it will be understood that when an element is referred to as being "connected to" another element, it can be directly connected to the other element, or one or more intervening elements may also be present. In addition, it will also be understood that when an element is referred to as being "between" two elements, it can be the only element between the two elements, or one or more intervening elements may also be present. Like reference numerals refer to like elements throughout.

FIG. 1 illustrates an exploded perspective view of a secondary battery according to an embodiment, and FIG. 2 illustrates a sectional view along line A-A' of FIG. 1. Referring to FIG. 1, the secondary battery according to an embodiment may include an electrode assembly 12 in a can 10, a cap assembly 20 sealing the can 10, and an insulation case 70 positioned between the electrode assembly 12 and the cap assembly 20.

The electrode assembly 12 may be formed by winding a separator 14 interposed between a positive electrode plate 15 and a negative electrode plate 13. A positive electrode tab 16 may be connected to the positive electrode plate 15 to protrude upward from a top portion of the electrode assembly 12, and a negative electrode tab 17 may be connected to the negative electrode plate 13 to protrude upward from a top portion of the electrode assembly 12. In the electrode assembly 12, the positive and negative electrode tabs 16 and 17 may be spaced apart from each other at a predetermined interval so as to be electrically isolated from each other. An insulation tape 18 for preventing a short circuit between electrodes plates 13 and 15 may be wound at portions of the positive and negative electrode tabs 16 and 17 that protrude from the electrode assembly 12.

That is, the positive and negative electrode tabs 16 and 17 may be electrically connected to the positive and negative electrode plates 15 and 13 of the electrode assembly 12, respectively. The positive and negative electrode tabs 16 and 17 may protrude in a direction in which the can 10 is opened. The positive and negative electrode tabs 16 and 17 may be electrically connected to the can 10 or a terminal plate 60 by respectively passing through lid through-holes 72 of the insulation case 70 fixed to the can 10, e.g., to a top of the electrode assembly 12.

The positive and negative electrode plates 15 and 13 may be manufactured by dry-coating an aluminum metal foil and a copper metal foil with slurry, respectively. At this time, the slurry may include active materials of the positive and negative electrode plates 15 and 13 and a fixing agent for attaching the respective active materials to the metal foils. In the case of a lithium secondary battery, an oxide containing lithium may be used as a positive electrode active material, and any of hard carbon, soft carbon, graphite and a carbon material may be used as a negative electrode active material. However, example embodiments are not limited to the lithium secondary battery.

The can 10 may accommodate the electrode assembly 12 through the opened side thereof The can 10 may have a rectangular cross-section, e.g., a cross-section along a horizontal direction as illustrated in FIG. 2, and may include a pair of short side portions 10a, e.g., narrow sidewalls of the can 10 positioned in the zy-plane, and a pair of long side portions 10b, e.g., wide sidewalls of the can 10 positioned in the xy-plane. The can 10 may have rounded corners, e.g., a contact area between a short side portion 10a and a long side portion 10b along the y-axis may be rounded. For example, the can 10 may have a rectangular opening with rounded corners. The horizontal cross-section of the can 10, however, is not limited thereto. Although not shown in this figure, the horizontal cross-section of the can 10 may be formed in any suitable shape, e.g., quadrangular, elliptical, etc. The can 10 may be formed of a metallic material, e.g., aluminum or aluminum alloy, which is light and flexible. The can 10 may be easily manufactured using a deep drawing method.

The can 10 may include a groove portion 19 on an inner surface thereof, i.e., on a surface of the can 10 facing the electrode assembly 12. In detail, as illustrated in FIG. 2, the groove portion 19 may be formed at an upper inner surface of the can 10, e.g., at the long side portion 10b and/or at the short side portion 10a, and may extend from a top edge of the battery can 10 to a predetermined depth along the y-axis. The groove portion 19 may define a space on which a protruding portion 71 of the insulation case 70 may be mounted, as will be described in more detail below with reference to FIGS. 3A and 3B. For example, the groove portion 19 may be formed in the short side portion 10a, so that the insulation case 70 may be effectively fixed to the can 10, i.e., by inserting the protruding portion 71 into the groove portion 19, while maintaining its balance.

A pair of the groove portions 19 may be formed at a same position of respective sides positioned symmetrically opposite to each other, i.e., the pair of groove portions 19 may be opposite each other on opposing sidewalls of the can 10. For example, as illustrated in FIG. 2, each groove portion 19 of the pair of groove portions 19 may be formed, e.g., symmetrically, on a respective short side portion 10a of the can 10 to face each other. Accordingly, when the insulation case 70 is fixed to the can 10, i.e., by inserting two protruding portions 71 into the pair of opposite groove portions 19, the insulation case 70 may be balanced, i.e., edges of insulation case 70 may be at a substantially same height level along the y-axis in the opposite groove portions 19, so an inclination of the mounted insulation case 70 may be prevented. Alternatively, only one groove portion 19 may be formed, thereby preventing the inclination of the insulation case 70, while simplifying a manufacturing process. That is, when the groove portion 19 is formed at only one side of the can 10, the insulation case 70 may be firmly secured to the can 10, i.e., via the protruding portion 71 and the groove portion 19, while preventing the insulation case 70 from being inverted into the can 10.

A horizontal cross-section of the groove portion 19 may be formed in various shapes. For example, as illustrated in FIG. 2, the horizontal cross-section of the groove portion 19 may have a rectangular shape. The insulation case 70 may be stably mounted on the groove portion 19, thereby maintaining its balance.

A thickness of a side portion of the can 10 including the groove portion 19 may be thicker than other portions of the can 10. For example, a thickness of the short side portion 10a of the can 10, e.g., a distance as measured along the x-axis, may be larger than a thickness of the long side portion 10b of the can 10, e.g., a distance as measured along the z-axis. An increased thickness of the short side portion 10a of the can 10 may increase strength of the can 10. Further, the strength of the can 10 may be maintained by maintaining a constant thickness of the short side portion 10a even though the groove portion 19 is formed therein.

Referring back to FIG. 1, the cap assembly 20 of the secondary battery may include a cap plate 40, an electrode terminal 30, an insulation plate 50, the terminal plate 60, and a gasket 35. When the cap assembly 20 is coupled to the can 10, the cap plate 40 may tightly seal the open surface of the can 10, thereby forming one surface of the can 10. For example, the cap plate 40 may be coupled to the open surface of the can 10 using welding. The cap plate 40 may be electrically connected to any one of the positive and negative electrode tabs 16 and 17. The cap plate 40 may include a first terminal hole 41 for coupling the gasket 35 to the cap plate 40 therethrough and an electrolyte injection hole 42 for injecting an electrolyte. The electrolyte injection hole 42 may be formed through the cap plate 40, and may be used as a passage for injecting the electrolyte into the can 10. After the electrolyte is injected into the can 10, the electrolyte injection hole 42 may be tightly sealed with a cover 43.

The gasket 35 may be used to secure insulation between the electrode terminal 30 and the cap plate 40. A terminal hole for coupling the electrode terminal 30 to the gasket 35 therethrough may be formed in the gasket 35, and the electrode terminal 30 may be coupled to the gasket 35 by passing through the terminal hole of the gasket 35.

The insulation plate 50 may be interposed between the cap plate 40 and the terminal plate 60, so the cap plate 40 and the terminal plate 60 may be insulated from each other. A second terminal hole 51 may be formed in the insulation plate 50, so that the electrode terminal 30 may pass through the insulation plate 50.

The terminal plate 60 may be electrically connected to the electrode terminal 30 through a third terminal hole 61. The terminal plate 60 may be electrically connected to any one of the positive and negative electrode tabs 16 and 17, which is not connected to the cap plate 40. For example, when the cap plate 40 is electrically connected to the positive electrode tab 16, the terminal plate 60 may be connected to the negative electrode tab 17. Accordingly, the terminal plate 60 may relay an electrical connection of the electrode terminal 30 and the negative electrode tab 17.

The insulation case 70 of the secondary battery may be positioned between the electrode assembly 12 and the cap assembly 20, so the electrode assembly 12 and the cap assembly 20 may be electrically insulated from each other. For example, the insulation case 70 may be inserted into a top portion of the can 10, e.g., at least a portion of the insulation case 70 may overlap a portion of the inner surfaces of the can 10. The insulation case 70 may provide easy and proper insulation between the electrode assembly 12 and the cap assembly 20, and the insulation case 70 may be formed of a material that substantially no deformation may be caused thereto by the electrolyte in the electrode assembly 12. The insulation case 70 may include a base portion 74 and a support portion 73. The insulation case 70 may be stably coupled to the can 10.

The base portion 74 of the insulation case 70 may be formed of a plate having a substantially constant thickness along the y-axis, e.g., the base portion 74 may be substantially flat. For example, the base portion 74 may have a substantially same structure, e.g., as viewed in the xz-plane, as the opening of the can 10, e.g., as viewed in the xz-plane after the electrode assembly 12 is accommodated inside the can 10, so the base portion 74 may fit into the opening of the can 10. For example, the base portion 74 may have a rectangular shape with rounded corners. To easily couple the base portion 74 to the can 10, the base portion 74 may be formed to have a slightly smaller size than that of a remaining space in the can 10 after the electrode assembly 12 is accommodated inside the can 10. An electrolyte injection hole (not shown) and the lid through-holes 72 may be formed in the base portion 74. The positive and negative electrode tabs 16 and 17 may be respectively inserted through the lid through-holes 72 of the insulation case 70 to prevent a short circuit between the top of the electrode assembly 12 inserted into the can 10 and a bottom of the cap assembly 20, e.g., the insulation case 70 may prevent a short circuit caused by a contact of the negative and positive electrode tabs 16 and 17 with an inner wall of the can 10.

The support portion 73 of the insulation case 70 may be integrally formed with the base portion 74 at least at a portion of an edge of the base portion 74. For example, as illustrated in FIG. 1, the support portion 73 may be only partially formed along a perimeter of the base portion 74, e.g., along a portion corresponding to the short side portion 10a of the can 10. When the cap assembly 20 and the insulation case 70 are accommodated inside the can 10, the support portion 73 may secure an interval between the cap assembly 20 and the insulation case 70. The support portion 73 may also serve as an insertion guide for inserting the insulation case 70 into the can 10.

The support portion 73 of the insulation case 70 may include the protruding portion 71, e.g., the support portion 73 and the protruding portion 71 may be formed integrally. The protruding portion 71 may be formed on an outer surface of the support portion 73, i.e., on a surface facing the groove portion 19 of the can 10, and may be aligned with the groove portion 19 of the can 10. Accordingly, the protruding portion 71 may be mounted on the groove portion 19 of the can 10, so the insulation case 70 may be securely fixed to the can 10, i.e., the inclination of the insulation case 70 may be prevented. When the inclination of the insulation case 70 is prevented, a top portion of the electrode assembly 12 under the insulation case 18 may not be pressurized by the insulation case 70. A number of the protruding portions 71 in the insulation case 70 may equal a number of the groove portions 19 in the can 10, e.g., a pair of protruding portions 71 may be formed at a same position of sides positioned symmetrically opposite to each other or only one protruding portion 71 may be formed. A horizontal cross-section of the protruding portion 71 may be substantially the same as that of the groove portion 19, e.g., a rectangular shape, so the protruding portion 71 may tightly fit into the groove portion 19. The insulation case 70 according to embodiments will be described in more detail below with reference to FIGS. 3A and 3B.

Figure 3A:
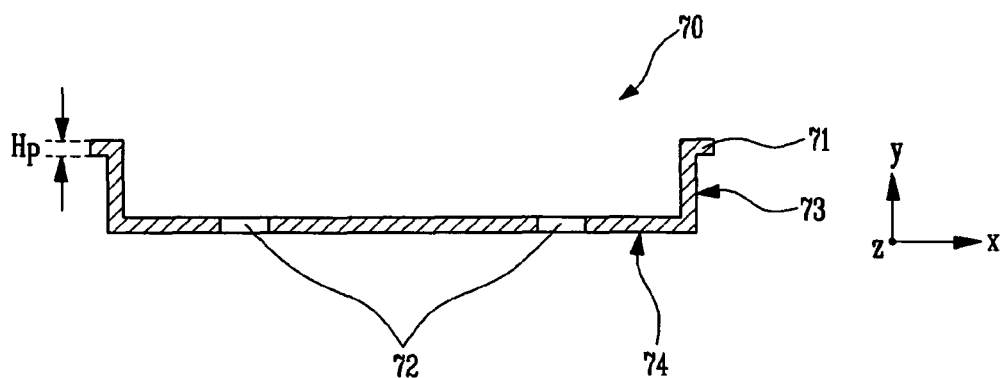
FIG. 3A illustrates a sectional view taken along line B-B' of FIG. 1.

FIG. 3A illustrates a cross-sectional view of the insulation case 70 along line

Figure 3B:
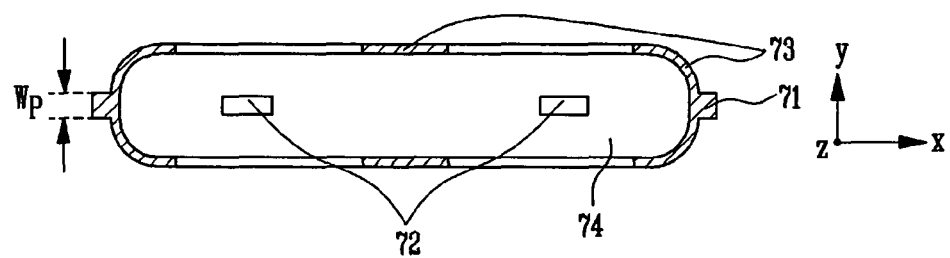
FIG. 3B illustrates a plan view of an insulation case according to an embodiment.

B-B' of FIG. 1. FIG. 3B illustrates a plan view of the insulation case 70.

As illustrated in FIGS. 3A-3B, the protruding portion 71 may be formed at the outer surface of the insulation case 70, which faces the position at which the groove portion 19 is formed. As further illustrated in FIG. 3A, the insulation case 70 may include the base portion 74 for defining a bottom of the insulation case 70 and the support portion 73, e.g., formed substantially perpendicularly to the base portion 74 at a portion of the edge of the base portion 74. For example, as illustrated in FIG. 3A, the support portion 73 may extend from the base portion 74 upwardly along the y-axis. Also, as illustrated in FIG. 3B, the support portion 73 may have rounded corners, e.g., corresponding to the rounded corners of the base portion 74. As further illustrated in FIG. 3A, the protruding portion 71 may be formed at an upper portion of the support portion 73, e.g., the protruding portion 71 may be at an uppermost edge of the support portion 73 to define an inverted L-shaped cross-section with the support portion 73. A horizontal length, e.g., a distance as measured along the x-axis, of the protruding portion 71 may substantially equal a horizontal depth of the groove portion 19, e.g., a distance as measured along the x-axis, so that the insulation case 70 may be fixedly inserted into the can 10. A vertical length of the protruding portion 71, e.g., a distance as measured along the y-axis, may be shorter than a height of the support portion 73, e.g., a distance as measured along the y-axis. An attachment of the insulation case 70 to the can 10 according to embodiments will be described in more detail below with reference to FIGS. 4A and 4B.

Figure 4A:
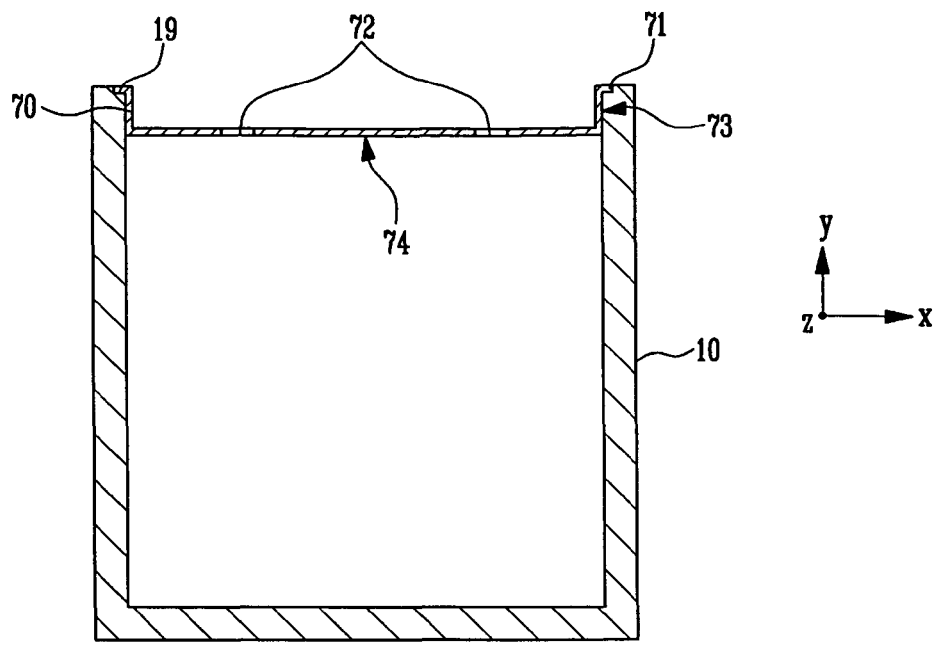
FIG. 4A illustrates a cross-sectional view of an insulation case attached to a can according to an embodiment.
Figure 4B:
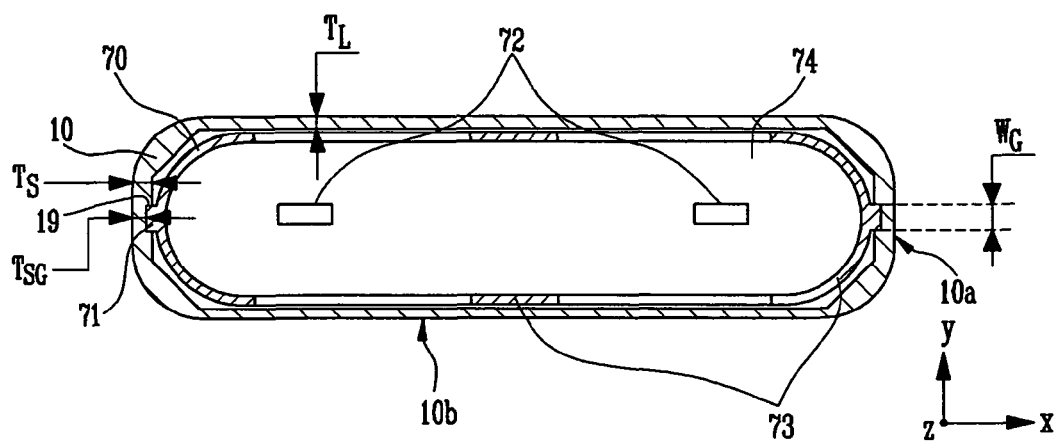
FIG. 4B illustrates a plan view of an insulation case attached to a can according to an embodiment.

FIG. 4A illustrates a cross-sectional view of the insulation case 70 inserted into the can 10 according to embodiment, i.e., assembled elements of FIGS. 2 and 3A. FIG. 4B illustrates a plan view of the insulation case 70 inserted in the can 10 according to embodiment.

Referring to FIGS. 4A and 4B, the insulation case 70 may be inserted into the top portion of the can 10, such that the protruding portion 71 of the insulation case 70 may be mounted on the groove portion 19 of the can 10. The insulation case 70 may be positioned between the cap assembly 20 (FIG. 1) and the electrode assembly 12 (FIG. 1) so as to prevent an electrical short circuit between the cap assembly 20 and the electrode assembly 12. For example, when an external impact, e.g., dropping of the secondary battery, is applied to the secondary battery, the pressure of the external impact may not be transformed through a corner of the insulation case 70 to the battery assembly 12 because the insulation case 70 has rounded corners.

As illustrated in FIGS. 4A and 4B, the groove portion 19 may be formed at the inner surface of the short side portion 10a of the can 10 which faces the protruding portion 71, so that the protruding portion 71 formed at the outer surface of the insulation case 70 may be effectively fixed to the can 10. The thickness of the short side portion 10a, e.g., a thickest portion of the short side portion 10a, may be thicker than that of the long side portion 10b, so the strength of the can 10 may be maintained by maintaining a constant thickness of the short side portion 10a even though the groove portion 19 is formed at the short side portion 10a. For example, a thickness $T_{SG}$ of a section of the short side portion 10a including the groove portion 19, e.g., a distance along the x-axis as measured from the groove portion 19 to a respective outermost surface of the short side portion 10a, may be substantially the same as a thickness $T_L$ of the long side portion 10b of the can 10. For example, if a thickness $T_S$ of the short side portion 10a of the can 10 is 0.38T, a horizontal depth of the groove portion 19 at the short side portion 10a may be about 0.15T to about 0.18T and the thickness $T_{SG}$ of the section of the short side portion 10a including the groove portion 19 may be about 0.2T to about 0.23T. Accordingly, the short side portion 10a of can 10 may maintain a minimum thickness to that of the long side portion 10b of the can 10, i.e., a thinnest section of the short side portion 10a that includes the groove portion 19 may maintain a minimum thickness to that of the long side portion 10b of the can 10.

The horizontal cross-sections of the groove portion 19 and the protruding portion 71 may be formed in various shapes, e.g., rectangular shapes, and may correspond to each other for the purpose of the balance of the insulation case 70. For example, as illustrated in FIG. 4B, the protruding portion 71 may fit, e.g., entirely, inside the groove portion 19, so the groove portion 19 may overlap at least three surfaces of the protruding portion 71. For example, as illustrated in FIG. 4A, the protruding portions 71 may fit into the groove portions 19 of the can 10, so the support portion 73 may extend on, e.g., directly on, the inner surfaces of the short side portion 10a of the can 10, and upper edges of the can 10 and the protruding portions 71 may be substantially coplanar. For example, a vertical length $H_P$ of the protruding portion 71, e.g., a distance as measured along the y-axis, may be substantially equal to a depth $H_G$ of the groove portion 19, e.g., a distance as measured along the y-axis. A width $W_G$ of the groove portion 19 may substantially equal to a width $W_P$ of the protruding portion 71.

As described above, according to example embodiments, a groove portion may be formed in a can of a secondary battery and a protruding portion may be formed in an insulation case, so that the protruding portion may be inserted into the groove portion when the insulation case is inserted into the can. Therefore, the insulation case may be stably secured to the can, so inclination of the insulation case inside the can may be prevented or substantially minimized. As inclination of the insulation case is prevented or substantially minimized, the insulation case may not pressurize the electrode assembly via contact therebetween, e.g., when external pressure is applied to the can. Since a top portion of the electrode assembly is not pressurized by the insulation case, it may be possible to prevent exposure of the negative electrode plate, which in turn, may prevent damage to the negative electrode active material. Further, it may be possible to prevent or substantially minimize heat exposure caused by the exposure of the negative electrode plate, thereby preventing a physical short circuit between the negative and positive electrode plates.

In contrast, when an insulation case cannot be properly and securely attached to the battery can, e.g., an insulation case formed of a light plastic resin may exhibit a weak elasticity and may be difficult to attach to a battery can, the insulation case may pressurize the electrode assembly, e.g., an external impact applied to the can may bend the insulation case toward the electrode assembly. Therefore, a bottom of the insulation case may expose the negative electrode by penetrating into the separator, thereby damaging the negative electrode active material. Further, if the top of the electrode assembly is pressurized, the separator may be deformed, so a short circuit may be caused by a direct contact between the positive and negative electrode plates.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode assembly having a positive electrode plate, a negative electrode plate, and a separator interposed between the positive and negative electrode plates;
   a can having at least one groove portion at an inner surface thereof, the electrode assembly being inserted into the can through an opening of the can to face the inner surface of the can, the opening being defined by an upper-most edge of the can;
   a cap assembly configured to seal the opening of the can; and
   an insulation case positioned in the can between the electrode assembly and the cap assembly, the insulation case including, a base portion, at least one support portion extending from the base portion, and at least one protruding portion extending respectively from an upper-most edge of the at least one support portion, spaced apart from the base portion along a vertical direction to be in different planes, and inserted into the groove portion of the can,
   wherein the groove portion of the can extends from the upper-most edge of the can to a predetermined depth along a vertical direction, the groove portion being in the form of a recess in the inner surface of the can and at only a part of a horizontal perimeter of the can, the at least one protruding portion of the insulation case filling the groove portion to have the upper-most edge of the can coplanar with a top of the at least one protruding portion.

2. The secondary battery according as claimed in claim 1, wherein the can includes two narrow sidewalls and two wide sidewalls arranged alternately, the opening of the can having a rectangular shape, and the groove portion being in the narrow sidewall of the can.

3. The secondary battery according as claimed in claim 2, wherein the opening of the can has a rectangular shape with rounded corners, the insulation case having a same shape as the opening.

4. The secondary battery according as claimed in claim 2, wherein a thickness of the narrow sidewall of the can is larger than that of the wide sidewall of the can, the wide sidewall extending in a longitudinal direction of the can.

5. The secondary battery according as claimed in claim 1, wherein the can includes a pair of the groove portions in opposite sidewalls of the can, and the insulation case includes a pair of the protruding portions corresponding to the pair of groove portions.

6. The secondary battery according as claimed in claim 5, wherein the pair of groove portions are symmetrical with respect to a center of the can.

7. The secondary battery according as claimed in claim 1, wherein the can includes a single groove portion.

8. The secondary battery according as claimed in claim 1, wherein a cross-section of each of the groove portion and the protruding portion is rectangular.

9. The secondary battery according as claimed in claim 8, wherein the protruding portion entirely fits inside the groove portion, the groove portion overlapping three surfaces of the protruding portion, an upper surface of the protruding portion and an upper surface of the groove portion extend along a same plane.

10. The secondary battery according as claimed in claim 1, wherein widths of the groove portion and the protruding portion equal each other, the widths of the groove and protruding portions being measured along a direction parallel to a line connecting two wide sidewalls of the can.

11. The secondary battery according as claimed in claim 10, wherein a height of the protruding portion along a vertical direction equals a depth of the groove portion along the vertical direction, the vertical direction extending along a normal to a bottom of the can.

12. The secondary battery according as claimed in claim 1, wherein the groove portion extends along the upper-most edge of the can to a predetermined thickness along a horizontal direction to define the recess in an uppermost surface of a sidewall of the can, the at least one protruding portion of the insulation case fitting in the indentation to have its uppermost surface coplanar with the uppermost surface of the sidewall of the can.

13. The secondary battery according as claimed in claim 1, wherein the at least one protruding portion of the insulation case extends away from a center of the can to be inserted into the groove portion of the can.

14. The secondary battery according as claimed in claim 1, wherein the at least one groove portion extends from the inner surface of the can toward an outer surface of the can to define a predetermined depth of the groove portion along a horizontal direction.

15. The secondary battery according as claimed in claim 1, wherein the at least one groove portion defines an opening in the inner surface of the can, the opening facing the insulation case, and the at least one protruding portion is seated inside the opening.

16. The secondary battery according as claimed in claim 1, wherein an uppermost surface of the at least one protruding portion is an uppermost surface of the insulation case.

17. The secondary battery according as claimed in claim 1, wherein an uppermost surface of a sidewall of the can is coplanar with an uppermost surface of the at least one protruding portion of the insulation case, the upper surfaces of the sidewall of the can and the protruding portion of the insulation case facing a same direction.

18. The secondary battery according as claimed in claim 4, wherein a thickness of the narrow sidewall at the groove portion is less than a thickness of the narrow sidewall adjacent to the groove portion.

19. The secondary battery according as claimed in claim 18, wherein the thickness of the narrow sidewall at the groove portion is substantially the same as the thickness of the wide sidewall.

20. The secondary battery according as claimed in claim 8, wherein the support portion and the protruding portion form an inverted L-shaped cross-section.

* * * * *